United States Patent
Tewari et al.

(10) Patent No.: US 10,904,126 B2
(45) Date of Patent: Jan. 26, 2021

(54) AUTOMATED GENERATION AND DYNAMIC UPDATE OF RULES

(71) Applicant: TATA CONSULTANCY SERVICES LIMITED, Mumbai (IN)

(72) Inventors: Tanmaya Tewari, Kolkata (IN); Surath Kumar Dey, Kolkata (IN); Swarup Chatterjee, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 340 days.

(21) Appl. No.: 14/191,063

(22) Filed: Feb. 26, 2014

(65) Prior Publication Data

US 2015/0120912 A1   Apr. 30, 2015

(30) Foreign Application Priority Data

Oct. 25, 2013 (IN) .......................... 3382/MUM/2013

(51) Int. Cl.
*H04L 12/24* (2006.01)
*H04L 12/26* (2006.01)

(52) U.S. Cl.
CPC .......... *H04L 43/16* (2013.01); *H04L 41/5009* (2013.01); *H04L 43/045* (2013.01); *H04L 43/067* (2013.01); *H04L 43/08* (2013.01)

(58) Field of Classification Search
CPC ..... H04L 43/067; H04L 43/08; H04L 43/045; H04L 43/16; H04L 41/5009; G06Q 30/02
USPC ........................................................ 709/224
See application file for complete search history.

(56) References Cited

U.S. PATENT DOCUMENTS

| 7,322,030 | B1 * | 1/2008 | Boodro ..................... G06F 8/36 717/170 |
| 9,449,491 | B2 * | 9/2016 | Sager ..................... G08B 23/00 |
| 2003/0110103 | A1 * | 6/2003 | Sesek .................. G06Q 10/087 705/28 |
| 2003/0120528 | A1 | 6/2003 | Kruk et al. |
| 2003/0208537 | A1 * | 11/2003 | Lane ....................... H04L 67/10 709/204 |
| 2005/0096866 | A1 * | 5/2005 | Shan ................... G06F 11/0751 702/179 |

(Continued)

OTHER PUBLICATIONS

Merriam-Webster Dictionary definition of "comprehensive" available online.*

*Primary Examiner* — Emmanuel L Moise
*Assistant Examiner* — Xiang Yu
(74) *Attorney, Agent, or Firm* — Seed IP Law Group LLP (57) ABSTRACT

The present subject matter relates to monitoring of an environment using data trend analysis. The method comprises obtaining at least one data trend pertaining to at least one data stream for a pre-defined period of time. The at least one data trend is indicative of a pattern followed by the at least one data stream. Further, at least one delta value pertaining to the at least one data stream may be computed, the at least one delta value being indicative of a deviation in the at least one data stream with respect to the at least one data trend at a specific time instance. Furthermore, at least one relationship between a plurality of data streams is identified based on the at least one data trend and identity metadata associated with each data stream. Based on the at least one delta value and the at least one relationship, at least one rule is generated.

11 Claims, 2 Drawing Sheets

(56) References Cited

U.S. PATENT DOCUMENTS

2007/0198679 A1* 8/2007 Duyanovich ....... G06F 11/3452
709/223
2009/0234623 A1 9/2009 Germain et al.
2014/0143610 A1* 5/2014 Nakatsugawa ..... G06F 11/1461
714/47.3

* cited by examiner

AUTOMATED GENERATION AND DYNAMIC UPDATE OF RULES

TECHNICAL FIELD

The present subject matter, in general, relates to trend analysis and, in particular, relates to method(s) and system(s) for automated generation and dynamic update of rules based on data trend analysis.

BACKGROUND

Nowadays, in order to get an insight of dynamics of various aspects related to an environment, organizations are investing their resources in the realm of trend analysis. As is generally understood, trend analysis relates to comparison of data over a period of time to identify various trends. Due to the widespread availability of data in every field, applications for trend analysis seem almost limitless. For example, trend analysis may be used to forecast information beneficial for growth and development of an organization, such as market trends, sales growth, inventory levels and interest rates. Trend analysis may also be used to monitor computing systems based on a number of software applications running on it. Further, trend analysis can also be used for failure analysis and as an early warning indicator of impending problems.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

System(s) and method(s) for automated generation and update of rules based on data trend analysis. The system(s) and method(s) can be implemented in a variety of computing devices, such as laptops, desktops, workstations, tablet-PCs, notebooks, portable computers, tablet computers, internet appliances, and similar systems. However, a person skilled in the art will comprehend that the embodiments of the present subject matter are not limited to any particular computing system, architecture, or application device, as they may be adapted to new computing systems and platforms as they become available.

In the last few decades, trend analysis techniques are being used in various realms across the globe, for example, for monitoring an environment in order to forecast future events based on historical data. An environment may be understood as any field or platform where trend analysis can be carried out for monitoring and prediction purposes. For example, an organization may opt for trend analysis to monitor their product sales and therefore, to anticipate associated future obstacles. Accordingly, the organization can take preemptive measures to avoid losses.

To ensure an exhaustive and detailed trend analysis, a large amount of data pertaining to the environment has to be handled and processed. For example, to evaluate performance of a computing system, data used by numerous software applications running on the computing system may be retrieved. Based on this data, a trend analysis may be conducted. The trend analysis may assist in determining a cause of any troublesome issue, such as a slow operation of the computing system, on the basis of data that may be used by each software application at different time instances. Therefore, if data used by a software application is exhibiting a substantial change from historical data trend, then an appropriate action may be accordingly taken to fix any issues, and an unhindered and smooth operation of the computing system is ensured.

Generally, in order to detect a deviation or change in data with respect to historical data trend, a plurality of rules is defined. A rule may be understood as a condition set by a user to detect any change in data from historical data trend. For example, a user may define a rule that as soon as amount of data used by a software application exhibits a variation of more than 10% from the historical data trend, an alarm has to be triggered. Similarly, in another example of monitoring of health scenario of a town by public health agencies, a rule may be defined that as soon as death toll of the town undergoes a variation of more than 5% from a historical data trend, an alarm has to be triggered. Therefore, such rules facilitate maintaining an effective track of events pertaining to an environment.

As would be appreciated by a person skilled in the art, different industries have different dynamics, and therefore can use trend analysis and rule generation for different purposes. However, such rules are generic in nature and can not be modified based on an application of the rules or the specific environment being monitored. Therefore, specific needs of an environment are not taken into consideration during rule generation leading to negligence of some significant aspects, and subsequently an erroneous and inaccurate monitoring.

Further, the rules are generally defined by a user or a group of users. The user may include, but is not limited to an expert in the corresponding field, and a stakeholder, such as a client for whom a software application is being developed. Therefore, validity and accuracy of the rules are dependent on skill-set of an individual and therefore, a possibility of errors in rule generation can not be negated.

Also, in case of generation of complex rules, the user may have to derive relationships between the data and the corresponding rules to ensure an accurate monitoring of the environment. Further, in case of complex systems, a large amount of data and multiple rules may have to be defined. Moreover, there exists a reasonable possibility of a gradual change in dynamics and characteristics of an environment over a period of time. As a consequence, the rules may have to be accordingly updated regularly. However, due to the manual nature of defining of rules, a significant amount of efforts have to be put by the user during generation and updating of the rules. Subsequently, such activities may demand substantial amount of time each time. As a result, an overall cost associated with the trend analysis is also significantly increased.

Considering a scenario where the user may have inadvertently defined incorrect rules. In such a scenario, when a report is generated based on the incorrect rules, the user may not be able to determine accuracy of the rules as well as data provided in the report. Therefore, in case of generation of incorrect rules, capturing faults becomes a challenge for the user. Further, this may make monitoring of the environment susceptible to errors. Furthermore, in case the invalidity of the rules is detected, the user may have to put significant efforts in rectifying the rules manually. Otherwise, the incorrect rules may have to be completely disabled.

According to the present subject matter, a rule generation system, hereinafter referred to as system, for generating and updating rules used for, for example, monitoring an environment based on data trend analysis is provided. In one implementation, the system may obtain at least one data trend corresponding to at least one data stream pertaining to the environment being monitored. In one implementation, a data stream may be understood as time ordered data, and may include, but is not limited to a data value, a time stamp and type of data. Further, the at least one data trend may be understood as a pattern followed by the at least one data stream during a predefined period of time.

Upon obtaining the at least one data trend, at least one delta value pertaining to the at least one data stream may be computed. The at least one delta value is indicative of a deviation in the at least one data stream with respect to the at least one data trend at a specific time instance. Further, at least one relationship between a plurality of data streams may be identified based on the at least one data trend and identity metadata associated with each data stream. The identity metadata may be understood as information that provides a unique ID to each data stream. Subsequently, based on the at least one relationship and the at least one delta value, at least one rule may be generated in an automated manner. The at least one rule is indicative of a condition set by a user for tracking the deviation in the at least one data stream. In one implementation, a notification being indicative of the at least one rule being violated may be provided to the user. The notification may include, but is not limited to details pertaining to the rule violation and a suggestion to overcome the rule violation.

Following the violation of the at least one rule over a period of time, a rule violation trend may also be identified. In one implementation, based on a user response to the notification, the rule violation trend, the at least one delta value, and the at least one relationship, the at least one rule may be automatically updated.

In one implementation, the system may utilize retrieval metadata for retrieving data pertaining to the environment from the at least one data source. The retrieval metadata may facilitate in identifying a location in the at least one data source, where the data is stored. Examples of the retrieval metadata may include, but is not limited to, a database name, a table name, a database IP, a database port, type of database, a database username, a database password, at least one query for retrieving data, and a retrieval frequency. Further, the at least one data source may include, but is not limited to an external database, an in-house database, and an online portal. Therefore, based on the retrieval metadata, the data may be retrieved from the at least one data source. In one implementation, sampling may be performed to select data for further monitoring of the environment. As may be known, sampling may include selection of a subset of data from within a statistical data to estimate characteristics of entire data.

In an implementation, the data retrieved from the at least one data source may be in different formats. In order to avoid an erroneous analysis due to non-uniformity in the format of the data, the data may be transformed into a format recognizable to the system, such as through natural language processing (NLP). In one implementation, the data may be transformed into the at least one data stream. Further, during the transformation, identity metadata may be allotted to each data stream. The identity metadata may provide a unique identity to each data stream. In one implementation, the identity metadata may include, but is not limited to details pertaining to the environment, an application, and a server.

In one implementation, the at least one data trend pertaining to the at least one data stream may be identified. As mentioned earlier, the at least one data trend is indicative of a pattern followed by the at least one data stream for the pre-defined period of time. Further, the system may obtain the at least one data trend for computing the at least one delta value. As mentioned above, the at least one delta value is a measure of a change in the at least one data stream with respect to the at least one data trend at a specific time instance. In one implementation, the at least one delta value may be computed in the form of a percentage of a data value of the at least one data stream.

Following the computation of the at least one delta value, the system may identify the at least one relationship between the plurality of data streams. In one implementation, the at least one relationship may be identified based on the identity metadata associated with each data stream. Once the at least one relationship is identified, the at least one rule may be generated based on the at least one data trend and the at least one relationship. The at least one rule may be understood as a condition set by a user to track the deviation in the at least one data stream. Further, upon violation of the at least one rule, i.e., when the condition is met, a notification may be provided to the user. In one implementation, in continuation to the rule violations over a period of time, the system may identify the corresponding rule violation trend. The rule violation trend is indicative of a pattern in which the rule violations have occurred over the period of time.

Further, the notification may include, but is not limited to, details pertaining to the rule violation, and a suggestion to overcome the rule violation. Considering an example where the system may evaluate data usage of computing systems, the suggestion may relate to termination of one or more software applications for which the at least one rule has violated. Further, the user may respond to the notification by accepting, rejecting, or ignoring the suggestion. Accepting the suggestion is indicative of a validity and accuracy of the at least one rule. However, rejection of the suggestion is indicative of an invalidity and inaccuracy of the at least one rule and therefore, the at least one rule may be considered invalid.

In one implementation, the at least one rule may be updated based on the user response, the at least one data trend, the at least relationship, and the rule violation trend. In one implementation, a performance report may also be generated for providing details pertaining to the automated generation and update of the rules.

As would be gathered, due to the automated generation and update of rules, the dependence of validity and accuracy of the rules on a skill-set of an individual may be avoided. Further, amount of efforts required for generation and update of complex rules may also be minimized. Subsequently, time invested and the associated cost is also minimized to a large extent. Also, since the rules are generated and updated based on the data trends, the rules are generated and updated considering specific dynamics of an environment ensuring an accuracy and reliability. In other words, revision of the rules based on any change in the data allows the system to be adaptable with dynamic and continuous changes in the environment. Also, by identifying relationship between different data streams, interdependence between various factors pertaining to an environment is utilized for accurate generation of rules. Therefore, the present subject matter facilitates a comprehensive, accurate, time-saving and cost efficient monitoring of an environment using data trend analysis.

These and other advantages of the present subject matter would be described in greater detail in conjunction with the following figures. While aspects of described system(s) and method(s) for automated generation and update of rules based on data trend analysis can be implemented in any number of different computing systems, environments, and/or configurations, the embodiments are described in the context of the following exemplary system(s).

Figure 1:
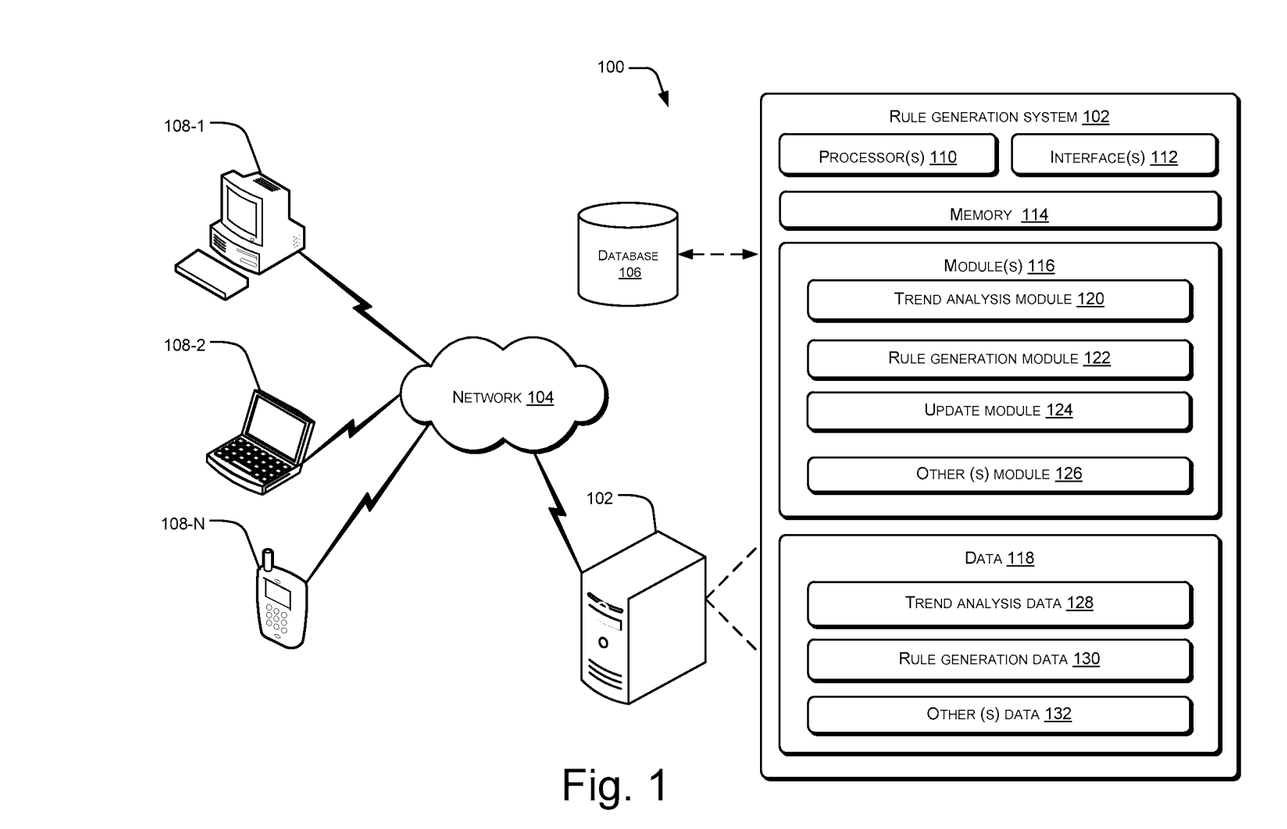
FIG. 1 illustrates a network environment implementing a rule generation system, in accordance with an embodiment of the present subject matter.

FIG. 1 illustrates a network environment 100 implementing a rule generation system 102, also referred to as system 102, according to an embodiment of the present subject matter. In the network environment 100, the system 102 is connected to a network 104. Further, the system 102 is connected to a database 106. Additionally, the network environment 100 includes one or more user devices 108-1, 108-2 . . . 108-N, collectively referred to as user devices 108 and individually referred to as user device 108, connected to the network 104.

The system 102 can be implemented as any set of computing devices connected to the network 104. For instance, the system 102 may be implemented as workstations, personal computers, desktop computers, multiprocessor systems, laptops, network computers, minicomputers, servers, and the like. In addition, the system 102 may include multiple servers to perform mirrored tasks for users.

Furthermore, the system 102 can be connected to the user devices 108 through the network 104. Examples of the user devices 108 include, but are not limited to personal computers, desktop computers, smart phones, PDAs, and laptops. Communication links between the user devices 108 and the system 102 are enabled through various forms of connections, for example, via dial-up modem connections, cable links, digital subscriber lines (DSL), wireless or satellite links, or any other suitable form of communication.

Moreover, the network 104 may be a wireless network, a wired network, or a combination thereof. The network 104 can also be an individual network or a collection of many such individual networks interconnected with each other and functioning as a single large network, e.g., the internet or an intranet. The network 104 can be implemented as one of the different types of networks, such as intranet, local area network (LAN), wide area network (WAN), the internet, and such. The network 104 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 104 may include network devices, such as network switches, hubs, routers, host bus adapters (HBAs), for providing a link between the system 102 and the user devices 108. The network devices within the network 104 may interact with the system 102 and the user devices 108 through communication links.

In said embodiment, the system 102 includes one or more processor(s) 110, interface(s) 112, and a memory 114 coupled to the processor 110. The processor 110 can be a single processing unit or a number of units, all of which could also include multiple computing units. The processor 110 may be implemented as one or more microprocessors, microcomputers, microcontrollers, digital signal processors, central processing units, state machines, logic circuitries, and/or any devices that manipulate signals based on operational instructions. Among other capabilities, the processor 110 is configured to fetch and execute computer-readable instructions and data stored in the memory 114.

The interfaces 112 may include a variety of software and hardware interfaces, for example, interface for peripheral device(s), such as a keyboard, a mouse, an external memory, and a printer. Further, the interfaces 112 may enable the system 102 to communicate with other computing devices, such as web servers, and external data repositories, such as the database 106, in the network environment 100. The interfaces 112 may facilitate multiple communications within a wide variety of protocols and networks, such as a network 104, including wired networks, e.g., LAN, cable, etc., and wireless networks, e.g., WLAN, cellular, satellite, etc. The interfaces 112 may include one or more ports for connecting the system 102 to a number of computing devices.

The memory 114 may include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The non-transitory computer-readable medium, however, excludes a transitory, propagating signal.

The system 102 also includes module(s) 116 and data 118. The module(s) 116 include routines, programs, objects, components, data structures, etc., which perform particular tasks or implement particular abstract data types. In one implementation, the module(s) 116 includes a trend analysis module 120, a rule generation module 122, an update module 124, and other module(s) 126. The other module(s) 126 may include programs or coded instructions that supplement applications and functions of the system 102.

On the other hand, the data 118, inter alia serves as a repository for storing data processed, received, and generated by one or more of the module(s) 116. The data 118 includes, for example, trend analysis data 128, rule generation data 130, and other data 132. The other data 132 includes data generated as a result of the execution of one or more modules in the module(s) 116.

In one implementation, the system 102 may facilitate an automated generation and dynamic update of rules based on data trend analysis. In one implementation, the trend analysis module 120 may utilize retrieval metadata for retrieving data from at least one data source. The retrieval metadata may include, but is not limited to a database name, a table name, a database IP, a database port, type of database, a database username, a database password, at least one query for retrieving data, and a retrieval frequency. Further, the at least one data source may include, but is not limited to an external database, an in-house database and an online portal. Therefore, the trend analysis module 120 may retrieve the data on the basis of the retrieval metadata. In a further implementation, the trend analysis module 120 may utilize a sample of the data for monitoring of the environment.

In one implementation, due to technical issues, there exists a possibility that data may not be retrieved for a period of time. In such an implementation, the trend analysis module 120 may estimate the missing data based on the earlier trends of such data. For example, the trend analysis module 120 may take an average of the data received before the technical problem and the data received after the technical problem to fill in details pertaining to the time period for which the data was not retrieved. Also, in cases, when the retrieved data is faulty or erroneous, then similar techniques can be adapted to estimate such data. Therefore, any inconsistency in retrieval of data may not hamper the overall analysis.

As would be appreciated by a person skilled in the art, the data retrieved from the at least one data source may be available in different formats. Therefore, the trend analysis module 120 may transform the data into a format recognizable to the system 102. In one implementation, the trend analysis module 120 may transform the data into at least one data stream. The data stream may be understood as time ordered data, and may include, but is not limited to a time stamp, a data value and type of data. The time stamp may indicate time of retrieval of the data from the at least one source. Further, the data value may indicate a numerical value of the data. Similarly, the type of data may be maintained to specify nature of the data. For example, in case of application monitoring, the data may be infrastructural data, application data and availability data.

In one implementation, the trend analysis module 120 may allot identity metadata to each data stream for providing a unique identity to each data stream. The identity metadata may further include, but is not limited to details pertaining to an environment name, an application, a server, and other configuration items. Such details may be utilized to distinguish a data stream from other data streams. In one implementation, following the transformation of the data into the at least one data stream, the trend analysis module 120 may identify at least one data trend pertaining to the at least one data stream. The at least one data trend is indicative of a pattern followed by the at least one data stream for a pre-defined period of time. The at least one data trend may assist in determining an average of the data value of the at least one data stream at a specific time instance. In one example, the at least one data trend may assist in determining a maximum and a minimum data value of the at least one data stream during a specified time period. For providing better clarity and understanding of the at least one data trend, Table 1 showing a data trend of a percentage Central Processing Unit (CPU) utilization by a software application is provided below.

TABLE 1

| | Day | | | | | | | | | | |
|---|---|---|---|---|---|---|---|---|---|---|---|
| Time | 1 | 2 | 3 | 4 | 5 | 6 | 7 | 8 | 9 | 10 | Trend |
| 10:00 | 4 | 2 | 2 | 4 | 2 | 3 | 5 | 3 | 4 | 1 | =sum(d1:d10)/10 |
| 10:03 | 6 | 3 | 2 | 2 | 2 | 4 | 4 | 2 | 4 | 2 | =sum(d1:d10)/10 |
| 10:06 | 2 | 4 | 2 | 1 | 2 | 5 | 3 | 1 | 3 | 1 | =sum(d1:d10)/10 |
| 10:09 | 1 | 2 | 1 | 3 | 1 | 6 | 2 | 1 | 2 | 1 | =sum(d1:d10)/10 |

As shown in the table 1, CPU utilization by the software application at different time instances for a duration of 10 days is analyzed. Further, an average of the CPU utilization may also be computed based on the at least one data trend shown in the table 1. Although, an average value is utilized for determining the at least one data trend in the table, however, in other implementations, the at least one data trend may be determined in terms of parameters other than an average or a mean value. For example, the at least one data trend may be determined in terms of a variance or a standard deviation from a mean value. Also, the trend analysis module 120 may update the at least one data trend as and when new data is retrieved from the at least one data source. In one implementation, details pertaining to the trend analysis module 120 may be stored in the trend analysis data 128.

In one implementation, the rule generation module 122 may obtain the at least one data trend for computation of at least one delta value pertaining to the at least one data stream. The at least one delta value may be understood as a deviation in the at least one data stream with respect to the at least one data trend at a specific time instance. In one implementation, the rule generation module 122 may compute the at least one delta value in form of a percentage of a data value of the at least one data stream. For example, if a data value of a data stream is 30, and the data value exhibits a deviation of a data value 6, then a corresponding delta value may be computed as 20%.

In one implementation, upon computation of the at least one delta value, the rule generation module 122 may identify at least one relationship between a plurality of data streams. For example, a data stream A may indicate data used by a software application at different time instances. Similarly, a data stream B may relate to percentage CPU utilization by the software application at different time instances. In one implementation, the percentage CPU utilization by the software application at a specific time instance may vary in proportion to the data used by the software application at the specific time instance. Therefore, any change in the data stream A may lead to a corresponding change in the data stream B. The rule generation module 122 may identify the at least one relationship based on the at least one data trend and the identity metadata corresponding to each data stream. Since the identity metadata pertaining to each data stream is indicative of the corresponding identification details, the rule generation module 122 may compare the identity metadata to establish at least one relationship between the pluralities of data streams. In one implementation, the rule generation module 122 may identify at least one relationship between the at least data trend and previously generated rules. Such an identification may assist in determining an effect of a violation of a rule on different data trends.

In one implementation, following the computation of the at least one delta value and the at least one relationship, the rule generation module 122 may generate at least one rule. The at least one rule is indicative of a condition set by a user to track a deviation in the at least one data stream. The user may include, but is not limited to an expert in the corresponding field, and a stakeholder. Further, the rule generation module 122 may generate the at least one rule to monitor a threshold violation at a specific time instance. For example, the rule generation module 122 may generate a rule that a delta value of a data stream should not exhibit a deviation of more than 10%. In such an example, as soon as the delta value of the data stream undergoes a variation of more than 10%, the rule is considered to be violated. In one implementation, a rule may be considered to be violated, when a condition set by the rule is satisfied or met.

In one implementation, the rule generation module 122 may generate the at least one rule to monitor a threshold violation in a pre-defined duration of time. For example, the rule generation module 122 may generate a rule that a delta value of a data stream deviates more than 10% between 2 PM to 4 PM. Therefore, as and when the delta value exhibits a variation of more than 10% between 2 PM and 4 PM, the rule is considered to be violated. In another implementation, the rule generation module 122 may generate the at least one rule to monitor consecutive events of threshold violation. For example, the rule generation module 122 may generate a rule that a delta value of a data stream deviates more than 10% for five consecutive data values. Therefore, as and when the delta value exhibits a variation of more than 10% for five consecutive data values, the rule is considered to be violated. In a yet another implementation, the rule generation module 122 may generate a rule with any combination of the abovementioned conditions.

In one implementation, the rule generation module 122 may also generate complex rules utilizing the at least one relationship between the plurality of data streams. For example, the rule generation module 122 may generate a rule that a delta value A of a data stream 1 deviates by 10% and a delta value B of a data stream 2 deviates by 5%. Therefore, when both these conditions are met, the rule is considered to be violated.

Upon violation of the at least one rule, the rule generation module 122 may provide a notification to the user to indicate the violation of the at least one rule. In one implementation, the notification may include, but is not limited to details pertaining to the rule violation, an action and a suggestion to overcome the rule violation. The action may include, but is not limited to an "accept", a "reject" and an "ignore" tab allowing the user to respond to the notification by accepting, rejecting or ignoring the notification. Further, when the user accepts the suggestion, it may indicate that the at least one rule is accurate and valid. Similarly, when the user rejects the suggestion, it may indicate that the at least one rule is inaccurate and invalid. In one implementation, details pertaining to the rule generation module 122 are stored in the rule generation data 130.

Further, the update module 124 may identify a rule violation trend pertaining to the violations of the at least one rule over a predetermined period of time. The rule violation trend may be understood as a pattern in which the at least one rule is violated. Based on the user response, the at least one data trend, the at least one relationship and the rule violation trend, the update module 124 may update the at least one rule. Therefore, the at least one rule may keep getting updated based on a change in the rule violation trend, the at least one relationship, the at least one data trend and the user response. In one implementation, the update module 124 may generate a performance report for providing details pertaining to the automated generation and update of the rules to the user. The performance report may include, but is not limited to the at least one data trend, the at least one delta value, the at least one relationship, the at least one rule, the at least one rule violation trend, and details pertaining to the revisions of the at least one rule. In one implementation, details pertaining to the update module 124 may be stored in the rule generation data 130.

Figure 2:
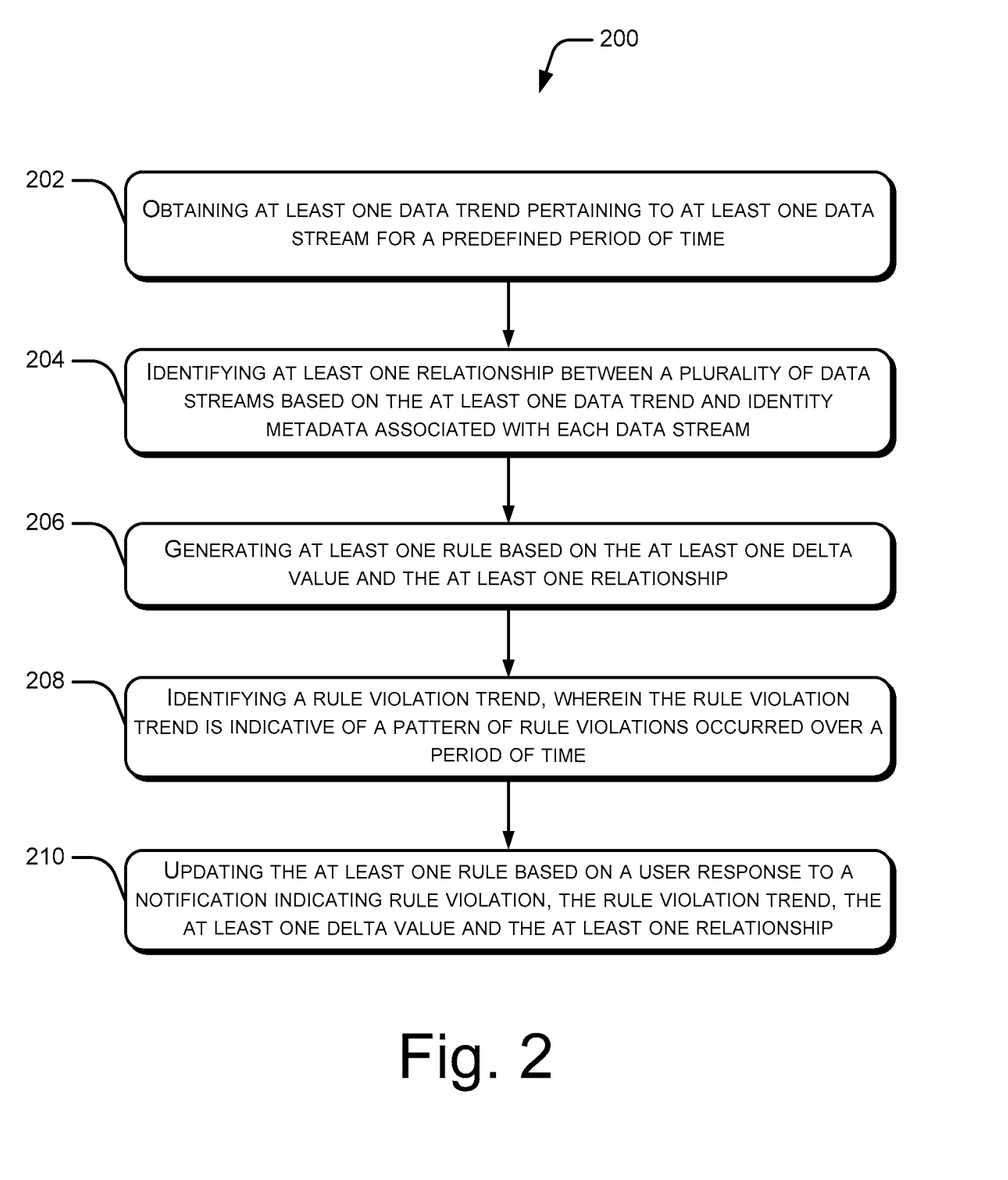
FIG. 2 illustrates a method for automated generation and dynamic update of rules based on data trend analysis, in accordance with an embodiment of the present subject matter.

FIG. 2 illustrates a method 200 for automated generation and dynamic update of rules based on data trend analysis, according to one embodiment of the present subject matter. The method 200 may be implemented in a variety of computing systems in several different ways. For example, the method 200, described herein, may be implemented using a rule generation system 102, as described above.

The method 200, completely or partially, may be described in the general context of computer executable instructions. Generally, computer executable instructions can include routines, programs, objects, components, data structures, procedures, modules, functions, etc., that perform particular functions or implement particular abstract data types. A person skilled in the art will readily recognize that steps of the method can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of the described method 200.

The order in which the method 200 is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the methods can be implemented in any suitable hardware, software, firmware, or combination thereof. It will be understood that even though the method 200 is described with reference to the system 102, the description may be extended to other systems as well.

The method 200 may facilitate an automated generation and dynamic update of rules based on data trend analysis. In one implementation, data may be retrieved from at least one data source based on retrieval metadata. The at least one data source may include, but is not limited to an external database, an in-house database and an online portal. Further, the retrieval metadata may include, but is not limited to a database name, a table name, a database IP, a database port, type of database, a database username, a database password, at least one query for retrieving data, and a retrieval frequency. In one implementation, a sample of the data may be utilized for monitoring of the environment.

In one implementation, there exists a possibility that due to technical issues, the data may not be retrieved for a period of time. In such an implementation, the missing data may be estimated based on the earlier trends of such data. For example, an average of the data received before the technical problem and the data received after the technical problem may be computed and considered to fill in details pertaining to the time period for which the data was not retrieved. Therefore, any inconsistency in retrieval of data may not hamper the overall analysis.

In another implementation, the data retrieved from the at least one data source may be transformed into a format recognizable to the system 102. In one implementation, the data may be retrieved in a raw format, and then may be transformed into at least one data stream. A data stream may be understood as time ordered data. Each data stream may include, but is not limited to a time stamp, a data value and type of data.

In one implementation, during the transformation, identity metadata may be allotted to each data stream for providing a unique identity to each data stream. The identity metadata may further include, but is not limited to details pertaining to an environment name, an application, a server, and other configuration items. In continuation to the transformation of the data into the at least one data stream, at least one data trend pertaining to the at least one data stream may be identified. The at least one data trend is indicative of a pattern followed by the at least one data stream for a pre-defined period of time. The at least one data trend may be updated as and when new data is retrieved from the at least one data source.

At block 202, the at least one data trend may be obtained for computation of at least one delta value pertaining to the at least one data stream. The at least one delta value is indicative of a deviation in the at least one data stream with respect to the at least one data trend at a specific time instance. In one implementation, the at least one delta value may be computed in form of a percentage of a data value of the at least one data stream. In one implementation, the rule generation module 122 of the system 102 may obtain the at least one data trend.

At block 204, upon computation of the at least one delta value, at least one relationship between a plurality of data streams may be identified. The at least one relationship may be identified based on the at least one data trend and the identity metadata corresponding to each data stream. In one implementation, the identity metadata pertaining to each data stream may be compared to establish the at least one relationship between the plurality of data streams. In one implementation, at least one relationship between the at least one data trend and previously generated rules for assisting in determining an effect of a violation of a rule on different data trends.

In one implementation, the rule generation module 122 of the system 102 may identify the at least one relationship between the plurality of data streams based on the at least one data trend and the identity metadata.

At block 206, based on the computation of the at least one delta value and the identification of the at least one relationship, at least one rule may be generated. The at least one rule may be understood as a condition set by a user to track a deviation in the at least one data stream. In one implementation, the user may include, but is not limited to an expert in the corresponding field, and a stakeholder. In one example, the at least one rule may be generated to monitor a threshold violation at a specific time instance. For example, a rule may be generated that a delta value of a data stream exhibits a deviation of more than 15%. Therefore, as soon as the delta value of the data stream exhibits a variation of more than 15%, the rule is considered to be violated as the condition has met. Similarly, the at least one rule may be generated to monitor a threshold violation in a pre-defined duration of time. Further, the at least one rule may be generated to monitor consecutive events of threshold violation. In one implementation, the at least one rule may be generated with any combination of the abovementioned conditions. In another implementation, complex rules may be generated utilizing the at least one relationship between the plurality of data streams.

Upon violation of the at least one rule, a notification may be provided to the user to indicate the violation of the at least one rule. In one implementation, the notification may include, but is not limited to details pertaining to the rule violation, an action and a suggestion to overcome the rule violation. The action may include, but is not limited to an "accept", a "reject" and an "ignore" tab allowing the user to respond to the notification by accepting, rejecting or ignoring the notification. Further, a validity and accuracy of the at least one rule may be established based on the user response. In one implementation, the rule generation module 122 of the system 102 may generate the at least one rule based on the at least one delta value and the at least one relationship.

At block 208, a rule violation trend pertaining to the violations of the at least one rule may be identified over a predetermined period of time. The rule violation trend may be understood as a pattern in which the at least one rule is violated. In one implementation, the update module 124 of the system 102 may identify the rule violation trend.

At block 210, the at least one rule may be updated on the basis of the user response, the at least one data trend, the at least one relationship and the rule violation trend. Further, the at least one rule may keep updating based on a change in the rule violation trend, the at least one relationship, the at least one data trend and the user response. In one implementation, a performance report may be generated for providing details pertaining to the automated generation and update of the rules to the user. The performance report may include, but is not limited to the at least one data trend, the at least one delta value, the at least one relationship, the at least one rule, the at least one rule violation trend, and details pertaining to the revisions of the at least one rule.

Although implementations of a method for automated generation and update of rules based on data trend analysis have been described in language specific to structural features and/or methods, it is to be understood that the present subject matter is not necessarily limited to the specific features or methods described.

We claim:

1. A computer implemented method for automated generation and updating of rules, the method comprising:

obtaining, by a processor, at least one data trend pertaining to at least one data stream for a pre-defined period of time, wherein the at least one data trend is indicative of a pattern followed by the at least one data stream during the pre-defined period of time, wherein the at least one data stream includes a time stamp, a data value and type of data, and wherein the at least one data trend assists in determining a maximum and a minimum data value of the at least one data stream during a specified time period, wherein the processor estimates missing data in the pre-defined period of time due to technical problem, in response to detecting the missing data in the at least one data stream, by computing an average of the data stream received before the technical problem and the data stream received after the technical problem to fill in details pertaining to the period in the pre-defined period of time with the missing data, wherein obtaining includes retrieving data from at least one data source based on retrieval metadata that facilitate in identifying a location of the data in the at least one data source;

computing, by the processor, at least one delta value pertaining to the at least one data stream, wherein the at least one delta value is indicative of a deviation in the at least one data stream with respect to the at least one data trend at a specific time instance;

identifying, by the processor, at least one relationship between a plurality of data streams based on the at least one data trend and identity metadata associated with each data stream, wherein the at least one relationship is identified by comparing the identity metadata between the pluralities of data streams, wherein the identity metadata is indicative of a unique identity of each data stream and include details pertaining to an environment name, an application, and a server;

generating, by the processor, at least one rule based on at least one delta value and the at least one relationship between the plurality of data streams to monitor at least of (i) a threshold violation in a pre-defined duration of time and (ii) monitor consecutive events of the threshold violation, wherein the at least one rule includes a condition set by a user for tracking the deviation in the at least one data stream;

providing, by the processor, a notification to the user to indicate violation of the at least one rule, wherein the notification includes at least one of details pertaining to the rule violation, an action and a suggestion to overcome the violation of the at least one rule, wherein a relationship between the at least one data trend and generated at least one rule determines an effect of the violation of the rule of varied data trends;

identifying, by the processor, a pattern of rule violation, by tracking a deviation of the at least one data stream at a specific time instance from a set condition based on the at least one rule, wherein a rule violation trend is generated based on the pattern of rule violations occurring over a period of time; and updating, by the processor, the at least one rule based on a user response to the notification, the rule violation trend, the at least one delta value, and the at least one relationship and continuously updating the at least one rule based on a change in user response, a change in the rule violation trend, a change in the at least one delta value, and a change in the at least one relationship, wherein the at least one data trend is updated whenever a new data is retrieved from at least one data source.

2. The computer implemented method as claimed in claim 1, wherein the obtaining comprises:

transforming, by the processor, the data retrieved based on the retrieval metadata into the at least one data stream, wherein the at least one data stream is in a pre-defined format wherein the retrieval metadata includes a database name, a table name, a database internet protocol (IP), a database port, a type of database, a database username, a database password, at least one query for retrieving data, and a retrieval frequency; and identifying, by the processor, the at least one data trend pertaining to the at least one data stream.

3. The computer implemented method as claimed in claim 2, wherein the obtaining further comprises selecting samples from the data for transforming into the at least one data stream.

4. The computer implemented method as claimed in claim 1, wherein the user responds to the notification by selecting one of an "accept", a "reject", and an "ignore" tab provided in the notification, wherein the selection of the "accept" indicate that the at least one rule is accurate and valid, wherein the selection of the "reject" indicate that the at least one rule is inaccurate and invalid.

5. The computer implemented method as claimed in claim 1 further comprising generating, by the processor, a performance report for providing details pertaining to the automated generation and update of rules, wherein the performance report comprises the at least one data trend, the at least one delta value, the at least one relationship, the at least one rule, the at least one rule violation trend, and details pertaining to revisions of the at least one rule.

6. A rule generation system for automated generation and dynamic update of rules, the rule generation system comprising:

a processor; and a rule generation module, coupled to the processor to:

obtain at least one data trend pertaining to at least one data stream for a pre-defined period of time, wherein the at least one data trend is indicative of a pattern followed by the at least one data stream during the pre-defined period of time, wherein the at least one data stream includes a time stamp, a data value and type of data, and wherein the at least one data trend assists in determining a maximum and a minimum data value of the at least one data stream during a specified time period, wherein the processor estimates missing data in the pre-defined period of time due to technical problem, in response to detecting the missing data in the at least one data stream, by computing an average of the data stream received before the technical problem and the data stream received after the technical problem to fill in details pertaining to the period in the pre-defined period of time with the missing data, wherein obtaining includes retrieving data from at least one data source based on retrieval metadata that facilitate in identifying a location of the data in the at least one data source;

compute at least one delta value pertaining to the at least one data stream, wherein the at least one delta value is indicative of a deviation in the at least one data stream with respect to the at least one data trend at a specific time instance;

identify at least one relationship between a plurality of data streams, based on the at least one data trend and identity metadata associated with each data stream, wherein the at least one relationship is identified by comparing the identity metadata between the plurality of data streams between the pluralities of data streams, wherein the identity metadata is indicative of a unique identity of each data stream and include details pertaining to an environment name, an application, and a server;

generate, by the processor, at least one rule based on at least one delta value and the at least one relationship between the plurality of data streams to monitor at least of (i) a threshold violation in a pre-defined duration of time and (ii) monitor consecutive events of the threshold violation, wherein the at least one rule includes a condition set by a user for tracking the deviation in the at least one data stream;

provide a notification to the user to indicate violation of the at least one rule, wherein the notification includes at least one of details pertaining to the rule violation, an action and a suggestion to overcome the violation of the at least one rule, wherein a relationship between the at least one data trend and generated at least one rule determines an effect of the violation of the rule of varied data trends;

identify a pattern of rule violation, by tracking a deviation of the at least one data stream at a specific time instance from a set condition based on at least one rule, wherein a rule violation trend is generated based on the pattern of rule violations occurring over a period of time; and update the at least one rule based on a user response to the notification, the rule violation trend, the at least one delta value, and the at least one relationship and continuously update the at least one rule based on a change in user response, a change in the rule violation trend, a change in the at least one delta value, and a change in the at least one relationship, wherein the at least one data trend is updated whenever a new data is retrieved from at least one data source.

7. The rule generation system as claimed in claim 6 further comprising:

a trend analysis module, coupled to the processor to:

transform the data retrieved based on the retrieval metadata into the at least one data stream, wherein the at least one data stream is in a pre-defined format, wherein the retrieval metadata includes a database name, a table name, a database internet protocol (IP), a database port, a type of database, a database username, a database password, at least one query for retrieving data, and a retrieval frequency; and identify the at least one data trend pertaining to the at least one data stream.

8. The rule generation system as claimed in claim 7, wherein the trend analysis module selects samples from the data for transforming into the at least one data stream.

9. The rule generation system as claimed in claim 6, wherein the user responds to the notification by selecting one of an "accept", a "reject", and an "ignore" tab provided in the notification, wherein the selection of the "accept" indicate that the at least one rule is accurate and valid, wherein the selection of the "reject" indicate that the at least one rule is inaccurate and invalid.

10. The rule generation system, as claimed in claim 6, wherein the rule generation module generates a performance report for providing details pertaining to the automated generation and update of rules, wherein the performance report comprises the at least one data trend, the at least one delta value, the at least one relationship, the at least one rule, the at least one rule violation trend, and details pertaining to revisions of the at least one rule.

11. A non-transitory computer-readable medium having embodied thereon a computer program for executing a method comprising:
   obtaining, by a processor, at least one data trend pertaining to at least one data stream for a pre-defined period of time, wherein the at least one data trend is indicative of a pattern followed by the at least one data stream during the pre-defined period of time, wherein the at least one data stream includes a time stamp, a data value and type of data, and wherein the at least one data trend assists in determining a maximum and a minimum data value of the at least one data stream during a specified time period, wherein the processor estimates missing data in the pre-defined period of time due to technical problem, in response to detecting the missing data in the at least one data stream, by computing an average of the data stream received before the technical problem and the data stream received after the technical problem to fill in details pertaining to the period in the pre-defined period of time with the missing data, wherein obtaining includes retrieving data from at least one data source based on retrieval metadata that facilitate in identifying a location of the data in the at least one data source;
   computing, by the processor, at least one delta value pertaining to the at least one data stream, wherein the at least one delta value is indicative of a deviation in the at least one data stream with respect to the at least one data trend at a specific time instance;
   identifying, by the processor, at least one relationship between a plurality of data streams, based on the at least one data trend and identity metadata associated with each data stream, wherein the at least one relationship is identified by comparing the identity metadata between the pluralities of data streams, wherein the identity metadata is indicative of a unique identity of each data stream and include details pertaining to an environment name, an application, and a server;
   generating, by the processor, at least one rule based on at least one delta value and the at least one relationship between the plurality of data streams to monitor at least of (i) a threshold violation in a pre-defined duration of time and (ii) monitor consecutive events of the threshold violation, wherein the at least one rule includes a condition set by a user for tracking the deviation in the at least one data stream;
   providing, by the processor, a notification to the user to indicate violation of the at least one rule, wherein the notification includes at least one of details pertaining to the rule violation, an action and a suggestion to overcome the violation of the at least one rule, wherein a relationship between the at least one data trend and generated at least one rule determines an effect of the violation of the rule of varied data trends;
   identifying, by the processor, a pattern of rule violation, by tracking a deviation of the at least one data stream at a specific time instance from a set condition based on the at least one rule, wherein a rule violation trend is generated based on the pattern of rule violations occurring over a period of time; and
   updating, by the processor, the at least one rule based on a user response to the notification, the rule violation trend, the at least one delta value, and the at least one relationship and continuously updating the at least one rule based on a change in user response, a change in the rule violation trend, a change in the at least one delta value, and a change in the at least one relationship, wherein the at least one data trend is updated whenever a new data is retrieved from at least one data source.

* * * * *